US012695247B2

(12) United States Patent
Balakrishnan et al.

(10) Patent No.: US 12,695,247 B2
(45) Date of Patent: Jul. 28, 2026

(54) CONNECTOR ASSEMBLY INTEGRATING MULTIPLE RECEPTACLE MODULES FOR A COMMUNICATION SYSTEM

(71) Applicant: TE Connectivity Solutions GmbH, Schaffhausen (CH)

(72) Inventors: Nitish Balakrishnan, Harrisburg, PA (US); Michael John Phillips, Camp Hill, PA (US); Eric David Briant, Dillsburg, PA (US); Linda Ellen Shields, Mechanicsburg, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 322 days.

(21) Appl. No.: 18/360,998

(22) Filed: Jul. 28, 2023

(65) Prior Publication Data
US 2024/0128685 A1 Apr. 18, 2024

Related U.S. Application Data

(60) Provisional application No. 63/417,032, filed on Oct. 18, 2022.

(51) Int. Cl.
*H01R 13/633* (2006.01)
*G02B 6/42* (2006.01)
*H01R 13/627* (2006.01)

(52) U.S. Cl.
CPC ....... *H01R 13/6335* (2013.01); *G02B 6/4278* (2013.01); *G02B 6/4284* (2013.01); *H01R 13/6273* (2013.01)

(58) Field of Classification Search
CPC ........... H01R 13/6335; H01R 13/6273; G02B 6/4278; G02B 6/4284
USPC .............................................. 439/540.1, 352
See application file for complete search history.

(56) References Cited

U.S. PATENT DOCUMENTS

| | | | | |
|---|---|---|---|---|
| 5,184,961 A * | 2/1993 | Ramirez | .............. | H01R 13/518 439/328 |
| 5,569,040 A * | 10/1996 | Sumida | ................ | H01R 13/516 439/157 |
| 7,303,336 B2 * | 12/2007 | Kayner | ................ | G02B 6/4284 385/53 |
| 7,717,721 B2 * | 5/2010 | Wu | ........................ | H01R 13/506 439/541.5 |
| 7,883,274 B2 * | 2/2011 | Luo | .................... | H01R 13/6335 385/53 |
| 9,122,030 B2 * | 9/2015 | Xie | ........................ | G02B 6/4278 |
| 10,539,753 B1 * | 1/2020 | Leigh | .................... | G02B 6/4268 |
| 2012/0275120 A1 * | 11/2012 | Nguyen | .............. | G02B 6/4292 361/747 |

(Continued)

*Primary Examiner* — Gary F Paumen

(57) ABSTRACT

A connector assembly includes a plurality of receptacle modules configured to be received in corresponding module channels in a receptacle cage. Each receptacle module has a housing holding a contact assembly. The housing has a card slot at a front of the housing. The contact assembly has contacts terminated to ends of cables. The contacts have mating ends at the card slot to mate with a pluggable module received in the receptacle cage. The connector assembly includes an integrator having integrator walls forming a plurality of chambers. Each chamber receives the corresponding receptacle module. The connector assembly includes a latch coupled to the integrator. The latch configured to be latchably coupled to the receptacle cage.

20 Claims, 7 Drawing Sheets

(56) References Cited

U.S. PATENT DOCUMENTS

| 2013/0071072 | A1* | 3/2013 | Xie | ...................... | G02B 6/4292 |
| | | | | | 385/92 |
| 2020/0088961 | A1* | 3/2020 | Zeng | .................... | G02B 6/4284 |

* cited by examiner

CONNECTOR ASSEMBLY INTEGRATING MULTIPLE RECEPTACLE MODULES FOR A COMMUNICATION SYSTEM

CROSS REFERENCE TO RELATED APPLICATIONS

This application claims benefit to U.S. Provisional Application No. 63/417,032, filed 18 Oct. 2022, titled "CONNECTOR ASSEMBLY INTEGRATING MULTIPLE RECEPTACLE MODULES FOR A COMMUNICATION SYSTEM", the subject matter of which is herein incorporated by reference in its entirety.

BACKGROUND OF THE INVENTION

The subject matter herein relates generally to communication systems.

Some communication systems utilize transceivers or plug modules as I/O modules for data communication. The plug module is pluggably received in a receptacle cage of a receptacle assembly to interconnect the plug module with another component, such as a host circuit board through a communication connector mounted to the host circuit board. Due to the high speed of data transmission and the length of the traces on the host circuit board between the communication connector and other components mounted to the host circuit board, some known communication systems bypass data transmission on the host circuit board using a cable receptacle connector. The cable receptacle connector may be received in the rear end of the receptacle cage and the plug module is mated directly to the cable receptacle connector. However, the cable receptacle connector tends to be bulky and require mounting features for mounting the cable receptacle connector to the receptacle cage. The mounting features widen the connector interface and occupy space adjacent the receptacle cage, which increases the footprints of the receptacle cages and the cable receptacle connectors on the host circuit board and limits the number of receptacle cages and cable receptacle connectors that may fit within a particular area.

A need remains for a communication system having a reduced footprint for mating pluggable modules.

BRIEF DESCRIPTION OF THE INVENTION

In one embodiment, a connector assembly is provided and includes a plurality of receptacle modules configured to be received in corresponding module channels in a receptacle cage. Each receptacle module has a housing holding a contact assembly. The housing has a card slot at a front of the housing. The contact assembly has contacts terminated to ends of cables. The contacts have mating ends at the card slot to mate with a pluggable module received in the receptacle cage. The connector assembly includes an integrator having integrator walls forming a plurality of chambers. Each chamber receives the corresponding receptacle module. The connector assembly includes a latch coupled to the integrator. The latch configured to be latchably coupled to the receptacle cage.

In another embodiment, a connector assembly is provided and includes a plurality of receptacle modules configured to be received in corresponding module channels in a receptacle cage. Each receptacle module has a housing holding a contact assembly. The housing has a card slot at a front of the housing. The contact assembly has contacts terminated to ends of cables. The contacts have mating ends at the card slot to mate with a pluggable module received in the receptacle cage. The receptacle modules including a first outer receptacle module, a second outer receptacle module, and an inner receptacle module located between the first and second outer receptacle modules. The connector assembly includes an integrator having integrator walls forming a plurality of chambers. Each chamber receives the corresponding receptacle module. The integrator walls including a first side wall, a second side wall, a base wall extending between the first and second side walls, and separator walls extending from the base wall between the first and second side walls. The plurality of chambers include a first outer chamber at the first side wall, a second outer chamber at the second side wall, and an inner chamber between the first and second outer chambers and separated from other chambers by the separator walls. The first outer chamber receives the first outer receptacle module. The second outer chamber receives the second outer receptacle module. The inner chamber receives the inner receptacle module. The connector assembly includes a latch coupled to the integrator. The latch configured to be latchably coupled to the receptacle cage to secure the first outer receptacle module. The second outer receptacle module, and the inner receptacle module in the receptacle cage.

In a further embodiment, a communication system is provided and includes a receptacle cage having cage walls forming a plurality of module channels. The cage walls provide electrical shielding for the module channels. The module channels are separated by divider walls. The receptacle cage has a front end and a rear end. The communication system includes pluggable modules received in the corresponding module channels at the front end. Each pluggable module includes a module circuit card has contact pads at a card edge. The communication system includes a connector assembly coupled to the rear end. The connector assembly including an integrator holding a plurality of receptacle modules. Each receptacle module received in the corresponding module channel in the receptacle cage to mate with the corresponding pluggable module. Each receptacle module has a housing holding a contact assembly. The housing has a card slot at a front of the housing configured to receive the card edge of the module circuit card of the corresponding pluggable module. The contact assembly has contacts terminated to ends of cables. The contacts have mating ends at the card slot to mate with the contact pads at the card edge of the module circuit card of the corresponding pluggable module. The integrator has integrator walls forming a plurality of chambers. Each chamber receives the corresponding receptacle module. The connector assembly has a latch coupled to the integrator. The latch is latchably coupled to the receptacle cage to secure the receptacle modules in the receptacle cage.

DETAILED DESCRIPTION OF THE INVENTION

Figure 1:
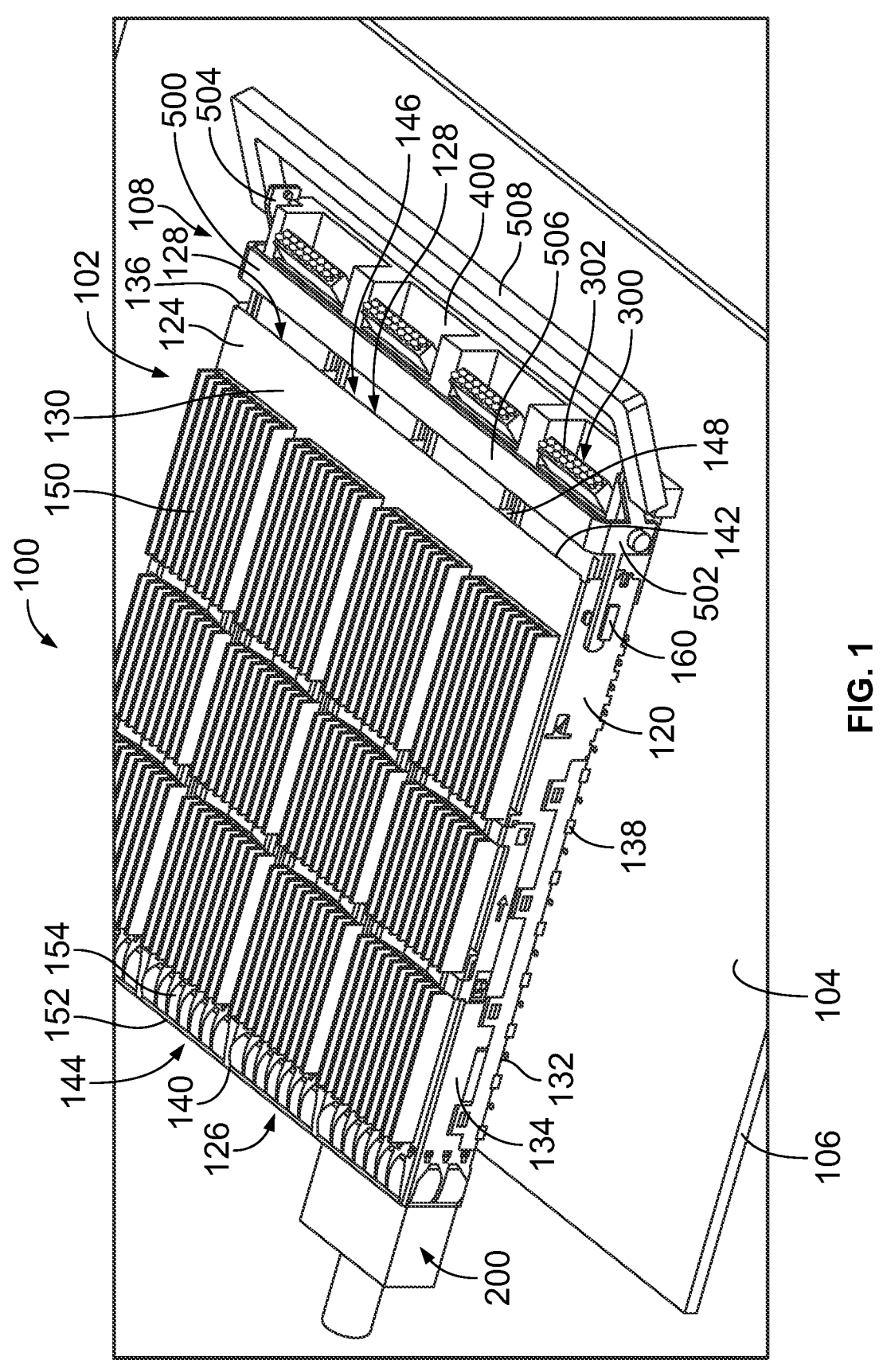
FIG. 1 is a top perspective view of a communication system formed in accordance with an exemplary embodiment.

FIG. 1 is a top perspective view of a communication system 100 formed in accordance with an exemplary embodiment. The communication system 100 includes a receptacle assembly 102 and one or more plug modules 200 configured to be electrically connected to the receptacle assembly 102. The receptacle assembly 102 includes a connector assembly 108 and a receptacle cage 120. The connector assembly 108 is removably coupled to the receptacle cage 120.

In an exemplary embodiment, the connector assembly 108 includes a plurality of receptacle modules 300, an integrator 400 configured to hold each of the receptacle modules 300, and a latch 500 coupled to the integrator 400 for latchably coupling the connector assembly 108 to the receptacle cage 120. The integrator 400 integrates the receptacle modules 300 together as a unit configured to be plugged into the receptacle cage 120 as the unit and removed from the receptacle cage 120 as the unit. The single latch 500 is used to latchably secure all of the receptacle modules 300 to the receptacle cage 120 and allows all of the receptacle modules 300 to unlatch from the receptacle cage 120 by releasing a single latch. In an exemplary embodiment, the latch 500 includes a first latch member 502 at a first side of the integrator 400 and a second latch member 504 at a second side of the integrator 400. In various embodiments, the latch 500 includes a connecting beam 506 between the first and second latch members 502, 504. The connecting beam 506 transfers relative movement between the first and second latch elements 502, 504, such as to unlatch both latch members 502, 504 simultaneously. In an exemplary embodiment, the latch 500 includes a handle 508 to actuate the latch 500, such as to move the latch 500 from a latched position to an unlatched position. The latch 500 is unlatched to allow removal of the connector assembly 108 from the receptacle cage 120 as a single component or unit. As such, all of the receptacle module 300 may be removed together.

The receptacle modules 300 are configured to be electrically connected to corresponding plug modules 200. In an exemplary embodiment, each plug module 200 is electrically connected to one or more cables 202 and each receptacle module 300 is electrically connected to one or more cables 302. The plug module 200 is pluggably coupled to the corresponding receptacle module 300 at a separable mating interface. The plug modules 200 and the receptacle modules 300 are removable from the shielding cage of the receptacle assembly 102.

In an exemplary embodiment, the receptacle assembly 102 is mounted to a support structure or substrate 104. For example, in the illustrated embodiment, the substrate 104 includes a circuit board 106. The receptacle assembly 102 is mounted to the circuit board 106. In an exemplary embodiment, neither the plug module 200 nor the receptacle module 300 is electrically connected to the circuit board 106. Rather, the plug module 200 and the receptacle module 300 are electrically connected to other electrical components via the cables 202, 302 rather than through traces on the circuit board 106. The circuit board 106 may provide a ground reference for the receptacle assembly 102. In an exemplary embodiment, the substrate 104 may additionally, or alternatively, include a panel, such as a rack panel in a server. In other various embodiments, the panel may include a cabinet or chassis of an electrical device, such as a computer. The panel may be another type of support structure in alternative embodiments, such as a metal plate or sheet.

The receptacle assembly 102 includes the receptacle cage 120. The receptacle modules 300 are configured to be loaded into a rear of the receptacle cage 120. The plug modules 200 are configured to be loaded into a front of the receptacle cage 120. The plug modules 200 are mated to the receptacle modules 300 inside the receptacle cage 120. In various embodiments, the receptacle cage 120 is enclosed and provides electrical shielding for the receptacle modules 300 and the plug modules 200.

The receptacle cage 120 includes a plurality of cage walls 124 that define a cavity 126. The cavity 126 is subdivided by corresponding cage walls 124 to form one or more module channels 128 for receipt of corresponding plug modules 200 and receptacle modules 300. In the illustrated embodiment, the cavity 126 is divided into four module channels 128, however, greater or fewer cage walls 124 may be provided to form a different number of the module channels 128, such as two module channels 128 or eight module channels 128. The module channels 128 may be stacked vertically and/or horizontally. The receptacle cage 120 includes front ports open at the front of the receptacle cage 120 to receive the plug modules 200 and rear ports open at the rear of the receptacle cage 120 to receive the receptacle modules 300. Any number of module channels 128 may be provided in various embodiments. For example, the receptacle cage 120 may include both ganged and stacked module channels 128 (for example, 2×2, 3×2, 4×2, 4×3, etc.). In other various embodiments, rather than being a ganged or stacked cage member, the receptacle cage 120 may include a single module channel 128. The cage walls 124 may be walls defined by solid sheets, perforated walls to allow airflow therethrough, or walls with cutouts, such as for a heat transfer device such as a heatsink, heat spreader, cold plate, and the like to pass therethrough. In the illustrated embodiment, the cage walls 124 are stamped and formed walls defining shielding walls.

In an exemplary embodiment, the cage walls 124 of the receptacle cage 120 include a top cage wall 130, a bottom cage wall 132, a first side cage wall 134, and a second side cage wall 136 for each module channel 128. The cage walls 124 are the outer or exterior walls. The bottom cage wall 132 may rest on the substrate 104. In an exemplary embodiment, the cage walls 124 include cage mounting tabs 138 for mounting the receptacle cage 120 to the substrate 104, such as to the circuit board 106. For example, the cage mounting tabs 138 may be press-fit pins configured to be press-fit into vias in the circuit board 106. Other types of cage mounting tabs 138 may be used in alternative embodiments. However, in alternative embodiments, the receptacle cage 120 may stand alone separate from any circuit board, such as being mounted to a panel or other structure without any circuit board present.

The receptacle cage 120 extends between a front end 140 and a rear end 142. Front ports 144 are provided at the front end 140 providing access to the corresponding module channels 128 for the plug modules 200. Rear ports 146 are provided at the rear end 142 providing access to the corresponding module channels 128 for the receptacle modules 300.

In an exemplary embodiment, some of the cage walls 124 define interior cage walls such as divider walls 148 that separate or divide the cavity 126 into the various module channels 128. The divider walls 148 extend between the top cage wall 130 and the bottom cage wall 132. The divider walls 148 are oriented parallel to the side cage walls 134, 136. The divider walls 148 may extend substantially an entire length of the receptacle cage 120 between the front end 140 and the rear end 142. The divider walls 148 provide electrical shielding between the module channels 128. The walls 130, 132, 134, 136, 148 form rectangular shaped module channels 128 in an exemplary embodiment extending along a longitudinal axis. The module channels 128 may extend the entire length between the front end 140 and the rear end 142.

In an exemplary embodiment, the receptacle assembly 102 includes heat sinks 150 at the top cage wall 130. The heat sinks 150 may extend into the module channels 128 to interface with the pluggable modules 200 and/or the receptacle modules 300 to dissipate heat from the pluggable modules 200 and/or the receptacle modules 300.

In an exemplary embodiment, the receptacle assembly 102 may include EMI gaskets 152 at the front end 140 and/or the rear end 142. The EMI gaskets 152 include EMI fingers 154 configured to interface with a panel and/or the support structure. The EMI fingers 154 may extend into the cavity 126 to interface with the pluggable modules 200 and/or the receptacle modules 300. The EMI gaskets 152 provide EMI shielding.

In an exemplary embodiment, the receptacle cage 120 includes latching features 160 at the first and second side walls 134, 136. The latching features 160 are located proximate to the rear end 142. In the illustrated embodiment, the latching features 160 are protrusions extending outward from the side walls 134, 136. The latching features 160 may be block shaped in various embodiments. The connector assembly 108 is coupled to the latching features 160 to securely couple the connector assembly 108 to the receptacle cage 120. The receptacle modules 300 are securely held in the corresponding module channels 128 when the connector assembly 108 is coupled to the latching features 160 of the receptacle cage 120. The connector assembly 108 may be unlatched from the latching features 160 to remove the receptacle modules 300 from the receptacle cage 120.

Figure 2:
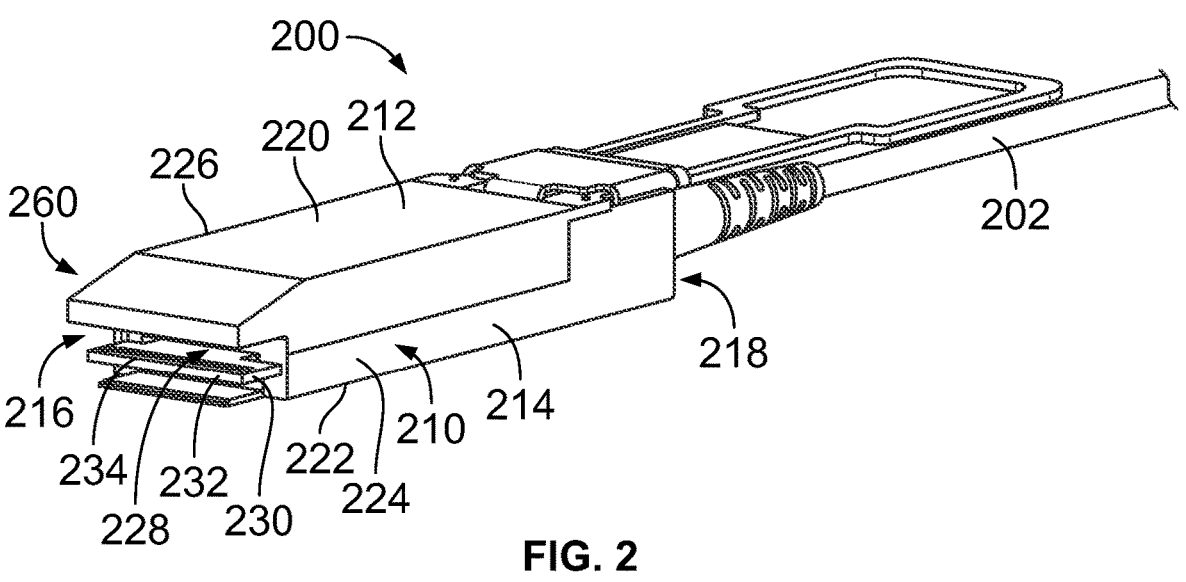
FIG. 2 is a perspective view of the plug module in accordance with an exemplary embodiment.

FIG. 2 is a perspective view of the plug module 200 in accordance with an exemplary embodiment. The plug module 200 includes a plug housing 210 defined by one or more shells, such as an upper shell 212 and a lower shell 214. In an exemplary embodiment, the plug housing 210 is manufactured from a conductive material, such as a metal material. The plug housing 210 provides electrical shielding for the plug module 200. The plug housing 210 may be thermally conductive. The plug housing 210 includes a mating end 216 and an opposite cable end 218. The cable 202 extends from the cable end 218. The mating end 216 is configured to be inserted into the corresponding module channel 128 (shown in FIG. 1).

The plug housing 210 includes a top wall 220, a bottom wall 222, a first side wall 224 extending between the top wall 220 and the bottom wall 222, and a second side wall 226 extending between the top wall 220 and the bottom wall 222. The plug housing 210 surrounds a plug module cavity 228. The plug module cavity 228 houses electrical components of the plug module 200. The cables 202 may extend into the plug module cavity 228 for termination to the electrical components.

In an exemplary embodiment, the plug module 200 includes a plug module circuit board 230 in the plug module cavity 228. The plug module circuit board 230 may be accessible at the mating end 216. The plug module circuit board 230 is configured to be communicatively coupled to the receptacle module 300 (shown in FIG. 1). For example, a mating edge 232 of the plug module circuit board 230 may be plugged into the receptacle module 300, such as in a card slot of the receptacle module 300. The plug module circuit board 230 includes electrical components used for operating and/or using the plug module 200. For example, the plug module circuit board 230 may have conductors, traces, pads, electronics, sensors, controllers, switches, inputs, outputs, and the like to form various circuits. In an exemplary embodiment, the plug module circuit board 230 includes contact pads 234 at the mating edge 232, such as along the upper surface and the lower surface of the plug module circuit board 230.

Figure 3:
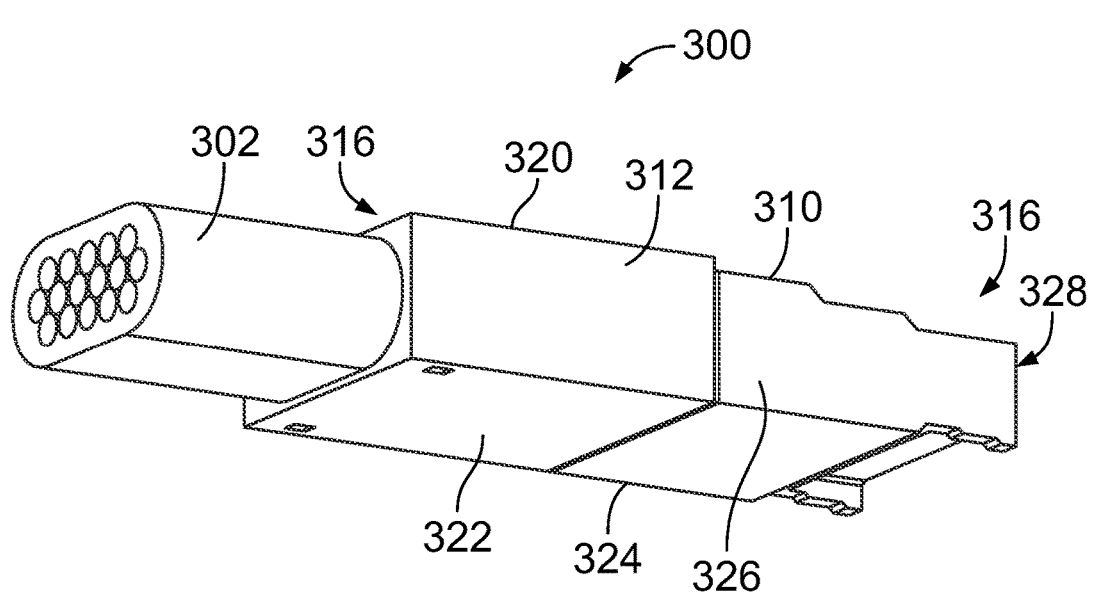
FIG. 3 is a rear perspective view of the receptacle module in accordance with an exemplary embodiment.
Figure 4:
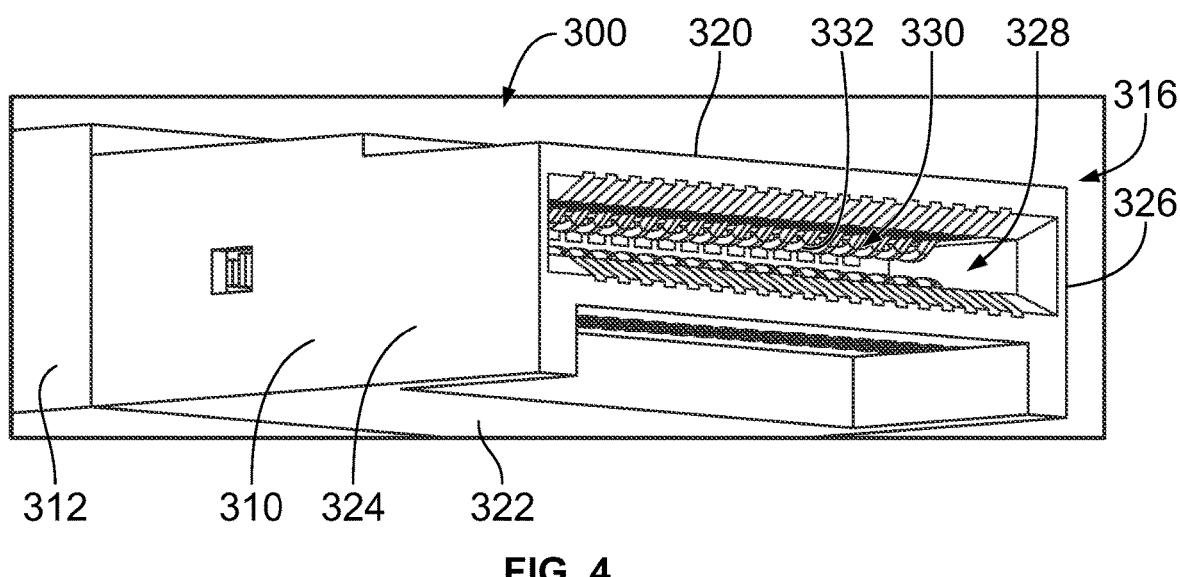
FIG. 4 is a front perspective view of a portion of the receptacle module in accordance with an exemplary embodiment.

FIG. 3 is a rear perspective view of the receptacle module 300 in accordance with an exemplary embodiment. FIG. 4 is a front perspective view of a portion of the receptacle module 300 in accordance with an exemplary embodiment.

The receptacle module 300 includes a receptacle housing 310 and a contact holder 312 holding a contact array 330 of receptacle contacts 332. The receptacle contacts 332 are terminated to the corresponding cables 302. The receptacle housing 310 is provided at a mating end 316 of the receptacle module 300. The mating end 316 is configured to be inserted into the corresponding module channel 128 (shown in FIG. 1). The receptacle contacts 332 extend to the mating end 316 to mate with the pluggable module 200 (shown in FIG. 2). The contact holder 312 extends to a cable end 318 of the receptacle module 300. The cable 302 extends from the cable end 318. In an exemplary embodiment, the contact holder 312 and the receptacle housing 310 are separate components configured to be coupled together during assembly to from the receptacle module 300. The contact holder 312 extends into the receptacle housing 310, such as into a rear cavity of the receptacle housing 310. However, in alternative embodiments, the receptacle housing 310 and the contact holder 312 are integral as a unitary, monolithic structure.

The receptacle housing 310 includes a top wall 320, a bottom wall 322, a first side wall 324 extending between the top wall 320 and the bottom wall 322, and a second side wall 326 extending between the top wall 320 and the bottom wall 322. In an exemplary embodiment, the receptacle housing 310 includes a card slot 328 at the mating end 316. The card slot 328 is configured to receive the plug module circuit board 230 (shown in FIG. 2).

The contact array 330 is coupled to the contact holder 312 and configured to be received in the receptacle housing 310. For example, the mating ends of the receptacle contacts 332 may be plugged into the receptacle housing 310 and located in the card slot 328 for interfacing with the plug module circuit board 230. In the illustrated embodiment, the receptacle contacts 332 are arranged in an upper row and a lower row on opposite sides of the card slot 328. The mating ends of the receptacle contacts 332 include spring beams configured to be deflected by the plug module circuit board 230 to maintain mechanical and electrical connection with the plug module circuit board 230. Conductors of the cables 302 may be terminated to the receptacle contacts 332, such as being soldered to the contacts 332.

Figure 5:
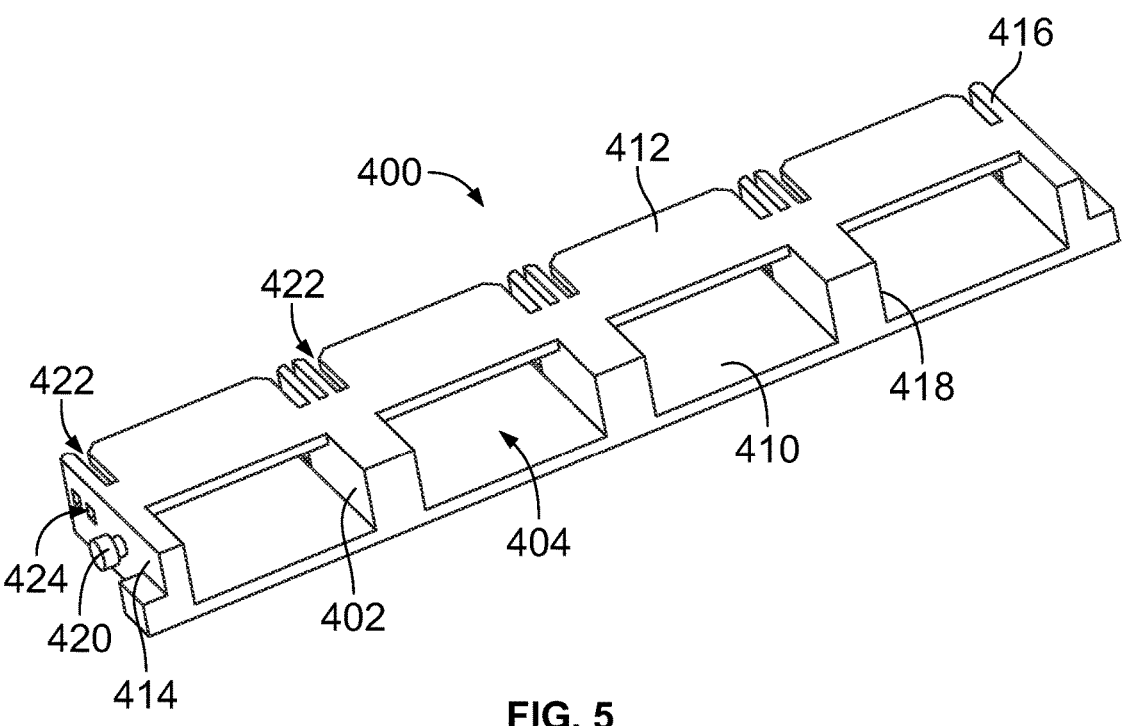
FIG. 5 is a rear perspective view of the integrator in accordance with an exemplary embodiment.

FIG. 5 is a rear perspective view of the integrator 400 in accordance with an exemplary embodiment. The integrator 400 includes integrator walls 402 forming a plurality of chambers 404. Each chamber 404 is configured to receive one of the corresponding receptacle modules 300 (shown in FIG. 3). The integrator 400 is configured to hold the receptacle modules 300 together as a unit within the chambers 404 for loading and unloading the unit into and out of the receptacle cage 120 (shown in FIG. 1).

The integrator 400 may be manufactured from a dielectric material, such as plastic. The integrator 400 may be a molded part, wherein all of the integrator walls 402 are integral with each other, such as being co-molded with each other. In an exemplary embodiment, the integrator walls 402 includes a base wall 410, a cover wall 412, a first side wall 414, a second side wall 416, and separator walls 418. The base wall 410 is at a bottom of the integrator 400. The cover wall 412 is at the top of the integrator 400. The side walls 414, 416 are at the first and second sides of the integrator 400. The base wall, the cover wall 412, and the side walls 414, 416 define the exterior walls of the integrator 400. The separator walls 418 define interior walls of the integrator 400. The separator walls 418 separate the chambers 404 from each other. The separator walls 418 are used to locate the receptacle modules 300 within the chambers 404. The separator walls 418 are oriented parallel to the side walls 414, 416 and extend between the base wall 410 and the cover wall 412. In the illustrated embodiment, three separator walls 418 are provided to define four chambers 404. Greater or fewer separator walls 418 and chambers 404 may be provided in alternative embodiments.

In an exemplary embodiment, the side walls 414, 416 include axles 420 extending outward from the outer surfaces of the side walls 414, 416. The axles 420 are used to support the latch 500 (shown in FIG. 1). The axles 420 may be cylindrical to allow the latch 500 to rotate relative to the integrator 400.

In an exemplary embodiment, the cover wall 412 and/or the side walls 414, 416 and/or the separator walls 418 include slots 422 at the front. The slots 422 are configured to receive portions of the contact holder 312 (shown in FIG. 1). The slots 422 are used to locate the contact holder 312 relative to the integrator 400. In an exemplary embodiment, the side walls 414, 416 and/or the separator walls 418 include latching features 424 used to secure the contact holder 312 in the corresponding chamber 404. For example, in the illustrated embodiment, the latching features 424 are openings configured to receive latches of the contact holders 312. However, other types of latching features may be used in alternative embodiments, such as deflectable latches, clips, fasteners, interference features, and the like.

Figure 6:
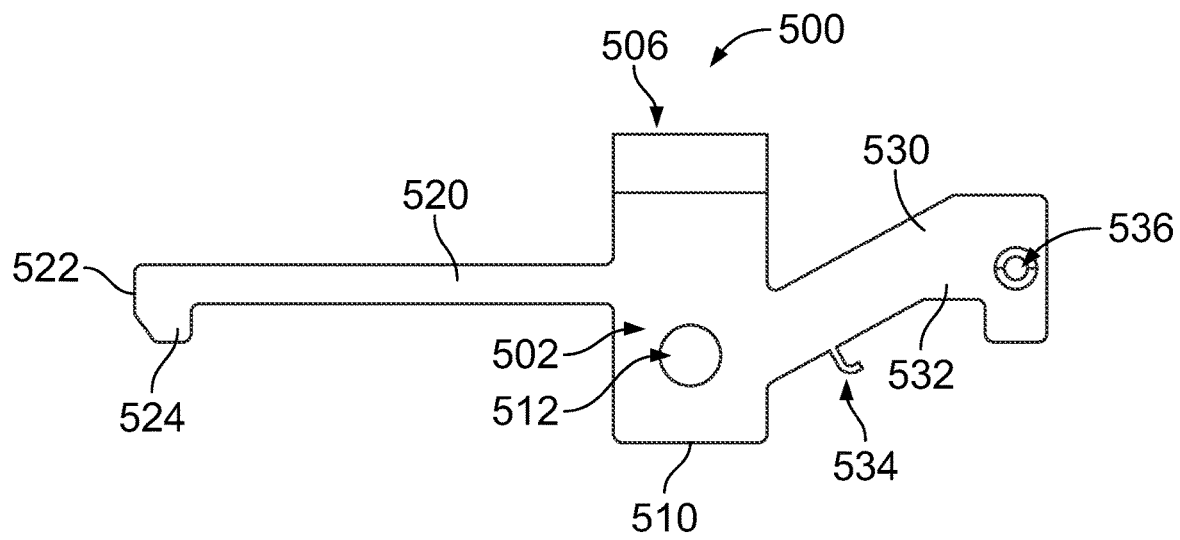
FIG. 6 is a side view of the latch in accordance with an exemplary embodiment.

FIG. 6 is a side view of the latch 500 in accordance with an exemplary embodiment. FIG. 6 shows the first latch element 502; however, components of the second latch element 504 (FIG. 1) may be identical to the components of the first latch element 502 and identified with like reference numerals. In an exemplary embodiment, the latch 500 is a stamped and formed part. The first latch element 502 is stamped and formed with the connecting beam 506 and the second latch element 504.

The latch element 502 includes a main body or hub 510, a latch arm 520 extending forward of the hub 510, and a latch actuator 530 extending rearward from the hub 510. In an exemplary embodiment, the connecting beam 506 extends from a top of the hub 510.

The hub 510 includes an opening 512, which is configured to receive the axle 420 (shown in FIG. 5) of the integrator 400. The hub is configured to be rotated about the axle 420. As such, the opening 512 defines a pivot point for the latch 500. In the illustrated embodiment, the opening 512 is located near a bottom of the hub 510. The opening 512 is located below the latch arm 520 and rotation of the hub causes the latch arm 520 to lift upward to unlatch the latch 500.

The latch arm 520 extends forward of the hub 510 to a distal end 522. The latch arm 520 includes a latch finger 524 at the distal end 522. The latch finger is configured to be latchably coupled to the latching feature 160 (shown in FIG. 1) of the receptacle cage 120. In the illustrated embodiment, the latch finger 524 is a hook provided at the distal end 522. Other types of latching components may be used in alternative embodiments. In the illustrated embodiment, the latch arm 520 extends generally horizontally. In various embodiments, the latch arm 520 may be pre-loaded. For example, the latch arm 520 may be angled slightly downward (for example, at a −5° angle) such that when the latch arm 520 is coupled to the latching feature 160, the latch arm 520 is slightly deflected upward to preload the latch arm 520.

The latch actuator 530 extends rearward from the hub 510. The latch actuator 530 includes an actuator beam 532 and a return spring 534 extending from the actuator beam 532. The handle 508 (shown in FIG. 1) is configured to be coupled to the end of the actuator beam 532. For example, the actuator beam 532 may include an opening 536 and the handle 508 is coupled to the actuator beam 532 at the opening 536, such as using a mounting pin or post extending into the opening 536. In the illustrated embodiment, the actuator beam 532 extends upward at an angle from the rear edge of the hub 510. The end of the actuator beam 532 may be located above the opening 512 to rotate or pivot the latch 500 in a clockwise direction to lift the latch arm 520 and release the latch arm 520 from the latching feature 160. Optionally, the opening 536 may be aligned with the latch arm 520 such that downward pressure on the latch actuator 530 by the handle 508 causes rotation of the latch arm 520 in the unlatching direction. In an exemplary embodiment, the return spring 534 extends from the bottom of the actuator beam 532. The return spring 534 is configured to engage the integrator 400 to bias the latch 500 in a latching direction. The return spring 534 may tend to push the latch actuator 530 upward, which causes the latch 500 to rotate in a counter-clockwise direction. Such return action causes the latch arm 520 to pivot downward to the latched position.

Figure 7:
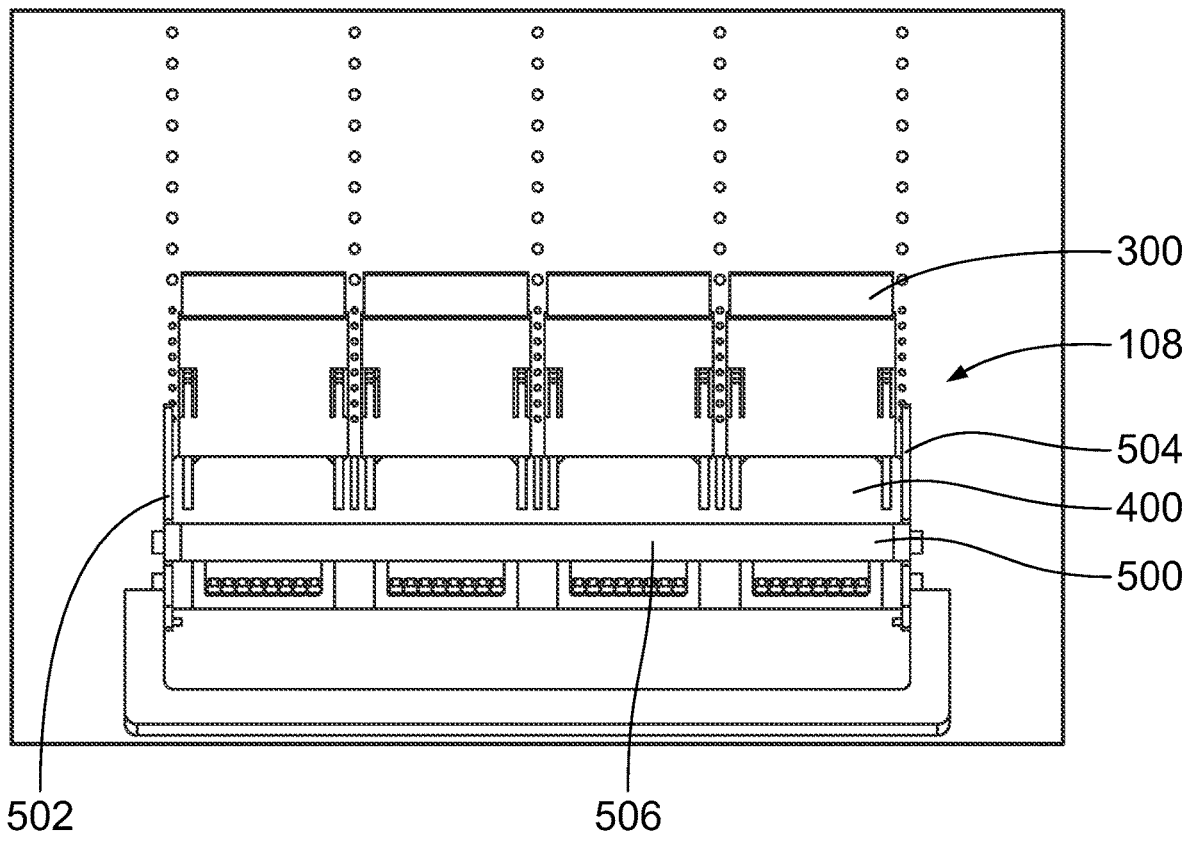
FIG. 7 is a top view of the connector assembly in accordance with an exemplary embodiment.

FIG. 7 is a top view of the connector assembly 108 in accordance with an exemplary embodiment. FIG. 7 shows the four receptacle modules 300 coupled to the integrator 400. The integrator 400 holds the receptacle modules 300. The latch 500 is coupled to the integrator 400 with the connecting beam 506 extending along the top of the integrator 400. The latch elements 502, 504 are located along the sides of the integrator 400 to engage the exterior sides of the receptacle cage 120 (shown in FIG. 1).

The receptacle modules 300 extend forward of the integrator 400. The receptacle modules 300 are held in the integrator 400 and positioned at spaced apart locations relative to each other. Small gaps are located between the receptacle modules 300, which are sized to receive the divider walls 148 of the receptacle cage 120. The receptacle modules 300 do not have individual latching features to secure the receptacle modules 300 to the divider walls 148. Rather, the latch 500 is used to secure the integrator 400 to the receptacle cage 120 to hold the receptacle modules 300 in the module channels 128. Because the receptacle modules 300 do not include separate latching components for connecting to the receptacle cage 120, the receptacle modules 300 may be spaced closer together (for example, smaller gaps, such as gaps only as wide as the widths of the divider walls 148). The overall footprint of the connector assembly 108 and the receptacle cage 120 can be reduced (compared to systems having receptacle modules 300 individually latched to the receptacle cage).

Figures 8, 9:
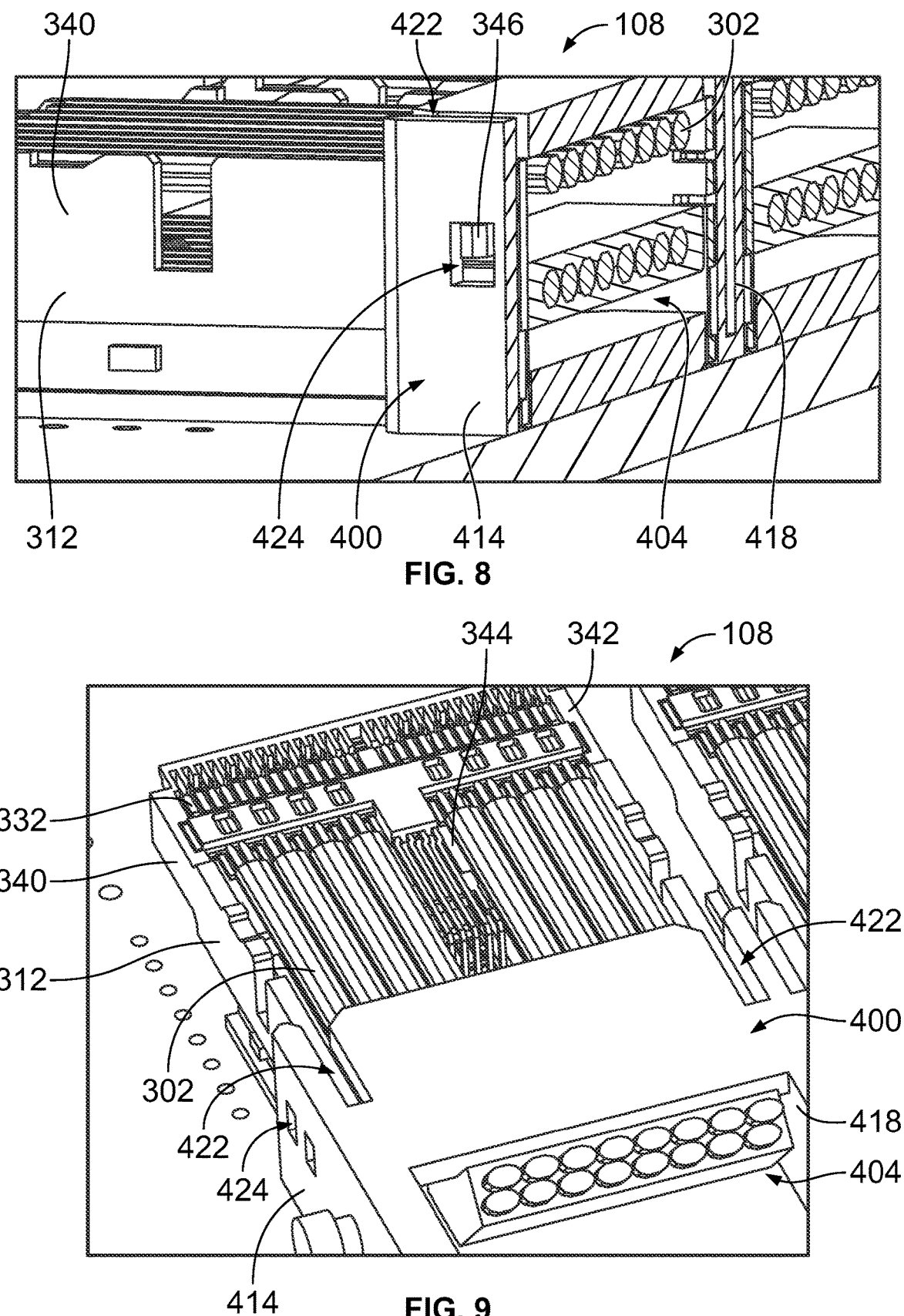
FIG. 8 is a sectional view of a portion of the connector assembly showing the contact holder coupled to the front portion of the integrator in accordance with an exemplary embodiment.
FIG. 9 is a sectional view of a portion of the connector assembly showing the contact holder coupled to the front portion of the integrator in accordance with an exemplary embodiment.

FIG. 8 is a sectional view of a portion of the connector assembly 108 showing the contact holder 312 coupled to the front portion of the integrator 400. FIG. 9 is a sectional view of a portion of the connector assembly 108 showing the contact holder 312 coupled to the front portion of the integrator 400.

The contact holder 312 includes side walls 340, 342 and a central wall 344 between the side walls 340, 342. The side walls 340, 342 are configured to be coupled to the integrator 400. For example, the side walls 340, 342 are received in the slots 422 in the side walls 414, 416 and/or the separator walls 418 of the integrator 400. In an exemplary embodiment, the side walls 340, 342 of the contact holder 312 include latches 346 that interface with the latching features 424 of the integrator 400 at the side walls 414, 416 and the separator walls 418. For example, the latches 346 are received in the openings defining the latching features 424 to secure the contact holder 312 in the corresponding chamber 404.

The contact holder 312 extends forward of the integrator 400. The central wall 344 includes a card slot (not shown) between upper and lower walls of the central wall 344. The contact holder 312 supports the receptacle contacts 332, such as in an upper row on the upper wall and a lower row on the lower wall of the central wall 344. The contact holder 312 supports the cables 302, such as in an upper row and a lower row. The cables 302 pass from the contact holder 312 into the chamber 404 to exit the connector assembly 108.

Figure 10:
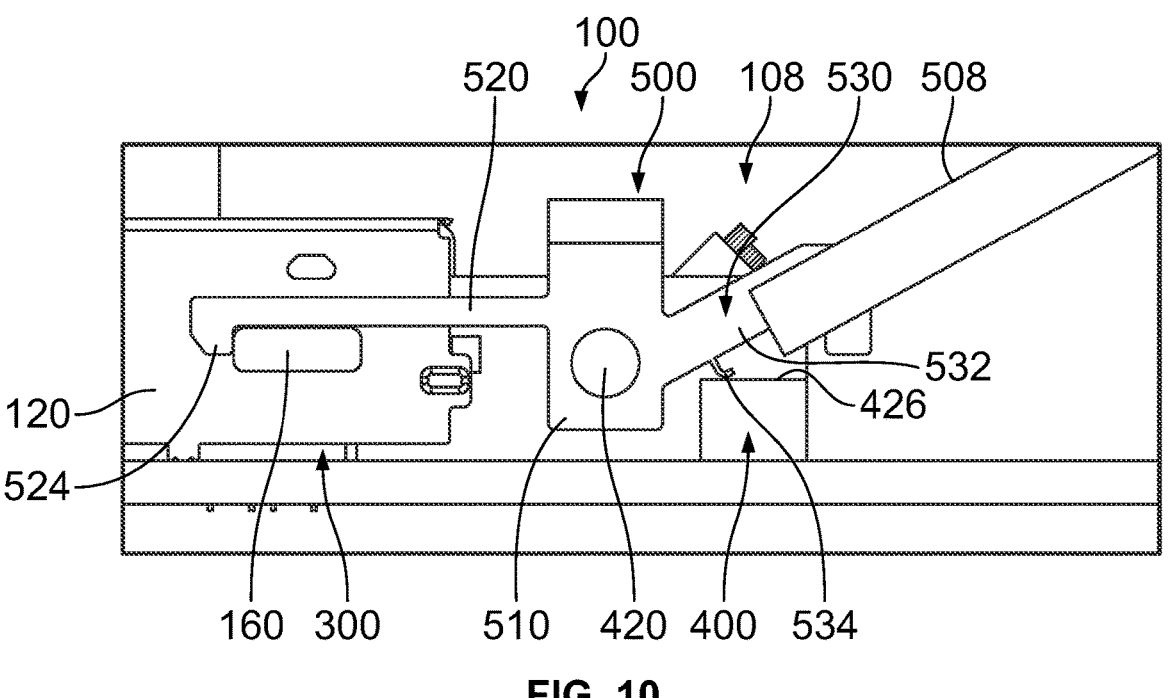
FIG. 10 is a side view of a portion of the communication system in accordance with an exemplary embodiment showing the connector assembly coupled to the rear of the receptacle cage with the latch in a latched state.
Figure 11:
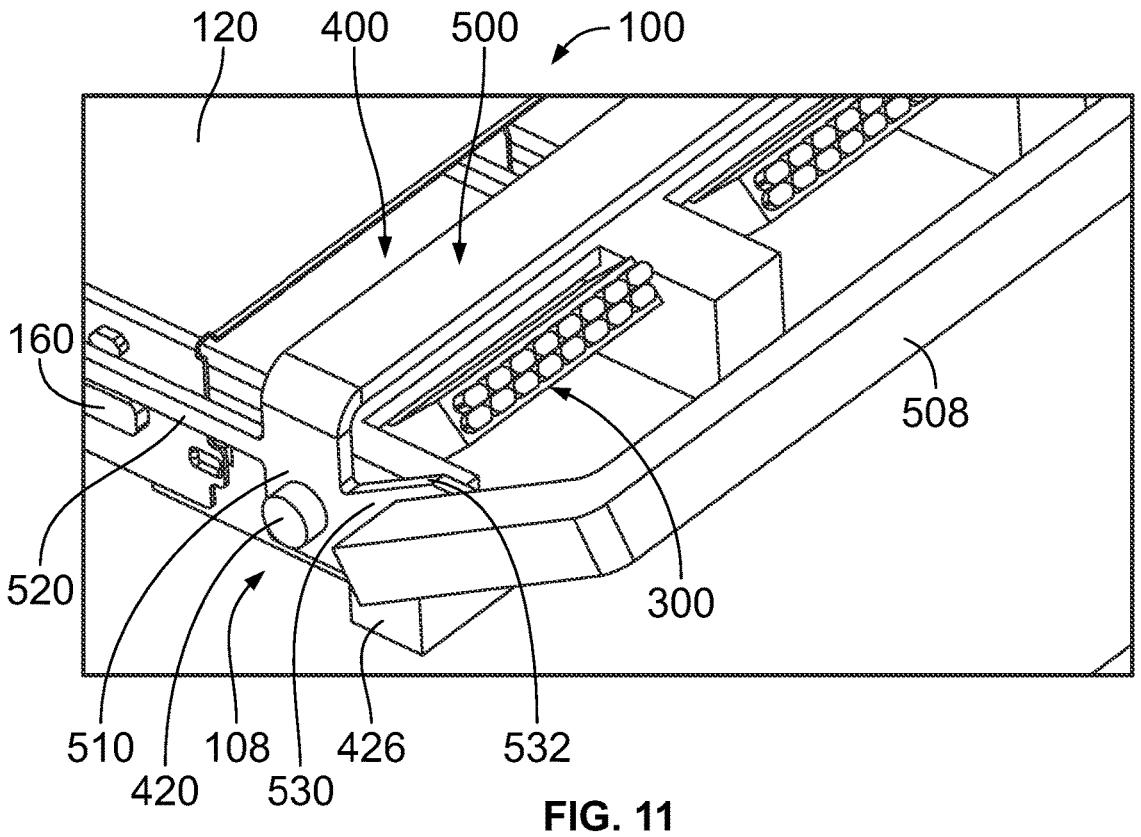
FIG. 11 is a rear perspective view of a portion of the communication system showing the connector assembly coupled to the rear of the receptacle cage in accordance with an exemplary embodiment.
Figure 12:
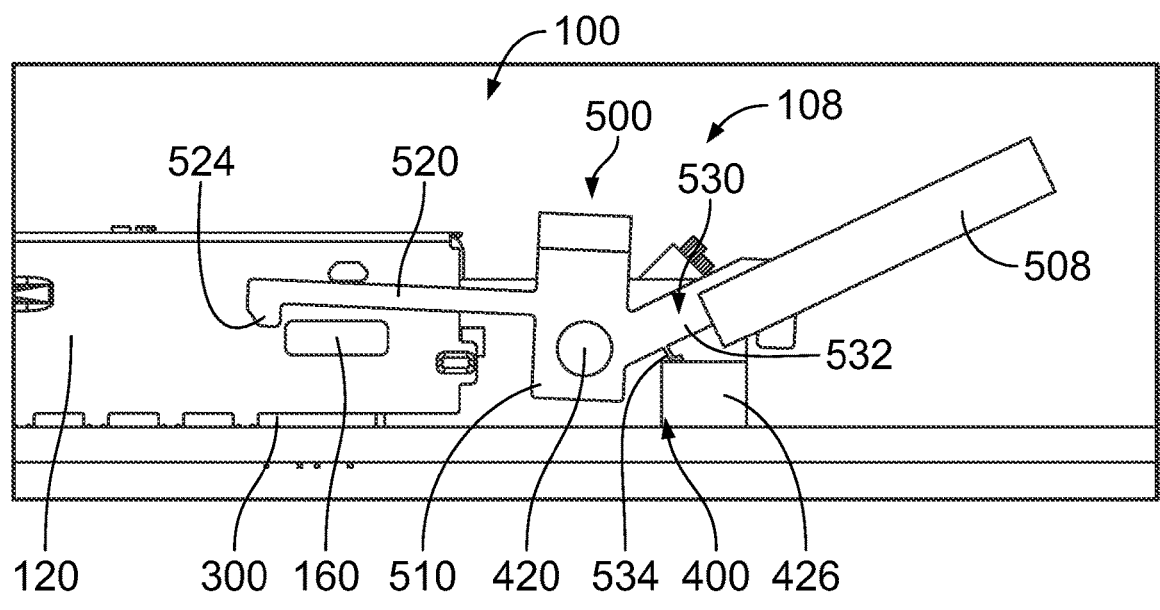
FIG. 12 is a side view of a portion of the communication system in accordance with an exemplary embodiment showing the connector assembly with the latch in an unlatched state.

FIG. 10 is a side view of a portion of the communication system 100 in accordance with an exemplary embodiment showing the connector assembly 108 coupled to the rear of the receptacle cage 120 with the latch 500 in a latched state. FIG. 11 is a rear perspective view of a portion of the communication system 100 showing the connector assembly 108 coupled to the rear of the receptacle cage 120. FIG. 12 is a side view of a portion of the communication system 100 in accordance with an exemplary embodiment showing the connector assembly 108 with the latch 500 in an unlatched state.

The latch 500 is coupled to the integrator 400. The latch 500 is located at an exterior of the integrator 400 to interface with an exterior of the receptacle cage 120. The hub 510 is coupled to the axle 420 at the side of the integrator 400. The latch arm 520 extends from the hub 510 and is configured to be latchably coupled to a latching feature 160 at the side wall of the receptacle cage 120. The latch finger 524 is configured to latch around a front surface of the latching feature 160 to secure the connector assembly 108 in the receptacle cage 120 and resist removal or pull out of the connector assembly 108. In an exemplary embodiment, the return spring 534 of the latch actuator 530 engages a support block 426 at the side of the integrator 400. The return spring 534 is configured to engage the integrator 400 to bias the latch 500 in a latching direction. The return spring 534 may tend to push the latch actuator 530 upward, which causes the latch 500 to rotate in a counter-clockwise direction. Such return action causes the latch arm 520 to pivot downward to the latched position. The handle 508 is coupled to the end of the actuator beam 532 and extends rearward. The handle 508 may be a push lever in various embodiments configured to be pushed downward to actuate the latch 500. In other various embodiments, the handle 508 is a pull tab configured to be pulled rearward or downward to actuate the latch 500. Downward pressure on the latch actuator 530 by the handle 508 causes rotation of the latch arm 520 in the unlatching direction. For example, when the handle 508 is actuated, the end of the actuator beam 532 is rotated or pivoted in a clockwise direction to lift the latch arm 520 upward and release the latch arm 520 from the latching feature 160.

When the latch 500 is unlatched, the connector assembly 108 is configured to be removed from the receptacle cage 120. For example, all of the receptacle modules 300 may be removed from the receptacle cage 120 as a unit. Unlatching of the single latch 500 allows removal of all of the receptacle modules 300. The integrator 400 forms a robust and efficient mating and unmating structure for the receptacle modules 300.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A connector assembly comprising:
a receptacle cage having cage walls forming a plurality of module channels, the cage walls providing electrical shielding for the module channels, the receptacle cage having a front end and a rear end with front ports at the front end open to the corresponding module channels and rear ports at the rear end open to the corresponding module channels, the module channels configured to receive pluggable modules through the front ports at the front end;

a plurality of receptacle modules received in the corresponding module channels through the rear ports at the rear end of the receptacle cage, each receptacle module having a housing holding a contact assembly, the housing having a card slot at a front of the housing, the contact assembly having contacts terminated to ends of cables, the contacts having mating ends at the card slot to mate with the corresponding pluggable module received in the receptacle cage, wherein a mating end of the receptacle module is located at an interior of the module channel surrounded by the cage walls;

an integrator coupled to the receptacle cage, the integrator having integrator walls forming a plurality of chambers, each chamber receiving the corresponding receptacle module; and a latch coupled to the integrator, the latch configured to be latchably coupled to the receptacle cage.

2. The connector assembly of claim 1, wherein the integrator walls include a base wall along a bottom of the integrator, a first side wall extending from the base wall at a first side of the integrator, a second side wall extending from the base wall at a second side of the integrator, and a separating wall extending from the base wall and located between the first and second side walls.

3. The connector assembly of claim 2, wherein the integrator walls include a cover wall between the first and second side walls at a top of the integrator, the cover wall connected to the separating wall, the chambers defined between the base wall and the cover wall.

4. The connector assembly of claim 2, wherein the latch is coupled to the first and second side walls.

5. The connector assembly of claim 1, wherein the integrator includes a front and a rear, the front being received in the interior of the receptacle cage to position the receptacle modules in the module channels.

6. The connector assembly of claim 1, wherein the receptacle modules are secured in the chambers of the integrator by latches.

7. The connector assembly of claim 1, wherein the plurality of receptacle modules are configured to be removed from the receptacle cage together as a unit by the integrator when the latch is unlatched from the receptacle cage.

8. The connector assembly of claim 1, wherein the latch is rotatably coupled to the integrator.

9. The connector assembly of claim 1, wherein the latch is located at an exterior of the integrator to interface with an exterior of the receptacle cage.

10. The connector assembly of claim 1, wherein the latch includes a first latch element at a first side of the integrator, a second latch element at a second side of the integrator, and a connecting beam between the first and second latch elements, the connecting beam transferring relative movement between the first and second latch elements.

11. The connector assembly of claim 10, wherein the latch includes a latch handle operably coupled to at least one of the first latch element and the second latch element to move the latch from a latched position to an unlatched position.

12. The connector assembly of claim 1, wherein the latch includes a latch element coupled to a first side of the integrator, the latch element including a hub rotatably coupled to an axle extending from the first side of the integrator, the latch including a latch arm extending from the hub to a latch finger configured to be latchably coupled to the receptacle cage.

13. The connector assembly of claim 12, wherein the latch element includes a latch actuator extending from the hub and a handle operably coupled to the latch actuator to move the latch element from a latched position to an unlatched position, the latch actuator including a return spring operably coupled to the integrator and configured to bias the latch element to the latched position.

14. A connector assembly comprising:

a receptacle cage having cage walls forming a plurality of module channels, the cage walls providing electrical shielding for the module channels, the receptacle cage having a front end and a rear end with front ports at the front end open to the corresponding module channels and rear ports at the rear end open to the corresponding module channels, the module channels configured to receive pluggable modules through the front ports at the front end;

a plurality of receptacle modules received in the corresponding module channels through the rear ports at the rear end of the receptacle cage, each receptacle module having a housing holding a contact assembly, the housing having a card slot at a front of the housing, the contact assembly having contacts terminated to ends of cables, the contacts having mating ends at the card slot to mate with the corresponding pluggable module received in the receptacle cage, wherein a mating end of the receptacle module is located at an interior of the module channel surrounded by the cage walls, the receptacle modules including a first outer receptacle module, a second outer receptacle module, and an inner receptacle module located between the first and second outer receptacle modules;

an integrator coupled to the receptacle cage, the integrator having integrator walls forming a plurality of chambers, each chamber receiving the corresponding receptacle module, the integrator walls including a first side wall, a second side wall, a base wall extending between the first and second side walls, and separator walls extending from the base wall between the first and second side walls, the plurality of chambers including a first outer chamber at the first side wall, a second outer chamber at the second side wall, and an inner chamber between the first and second outer chambers and separated from other chambers by the separator walls, the first outer chamber receiving the first outer receptacle module, the second outer chamber receiving the second outer receptacle module, the inner chamber receiving the inner receptacle module; and a latch coupled to the integrator, the latch configured to be latchably coupled to the receptacle cage to secure the first outer receptacle module, the second outer receptacle module, and the inner receptacle module in the receptacle cage.

15. The connector assembly of claim 14, wherein the receptacle modules are secured in the chambers of the integrator by latches and wherein the plurality of receptacle modules are configured to be removed from the receptacle cage together as a unit by the integrator when the latch is unlatched from the receptacle cage.

16. The connector assembly of claim 14, wherein the inner receptacle module is held in the receptacle cage by the latch latchably coupled to an exterior of the receptacle cage.

17. A communication system comprising:

a receptacle cage having cage walls forming a plurality of module channels, the cage walls providing electrical shielding for the module channels, the module channels being separated by divider walls, the receptacle cage having a front end and a rear end with front ports at the front end open to the corresponding module channels and rear ports at the rear end open to the corresponding module channels;

pluggable modules received in the corresponding module channels through the front ports at the front end, each pluggable module including a module circuit board having contact pads at a card edge;

a connector assembly coupled to the rear end, the connector assembly including an integrator holding a plurality of receptacle modules, each receptacle module received in the corresponding module channel in the receptacle cage through the rear ports at the rear end such that a mating end of the receptacle module is located at an interior of the module channel surrounded by the cage walls to mate with the corresponding pluggable module in the receptacle cage, each receptacle module having a housing holding a contact assembly, the housing having a card slot at a front of the housing configured to receive the card edge of the module circuit board of the corresponding pluggable module, the contact assembly having contacts terminated to ends of cables, the contacts having mating ends at the card slot to mate with the contact pads at the card edge of the module circuit board of the corresponding pluggable module, the integrator coupled to the receptacle cage, the integrator having integrator walls forming a plurality of chambers, each chamber receiving the corresponding receptacle module, the connector assembly having a latch coupled to the integrator, the latch being latchably coupled to the receptacle cage to secure the receptacle modules in the receptacle cage.

18. The communication system of claim 17, wherein the cage walls include a first side wall, a second side wall, and a top wall between the first and second side walls, the divider walls extending from the top wall and oriented parallel to the first and second side walls, the integrator walls being aligned with the first and second side walls and the divider walls to align the chambers with the module channels.

19. The communication system of claim 17, wherein the latch includes first and second latch arms coupled to first and second side walls of the cage walls to secure the connector assembly to the receptacle cage.

20. The communication system of claim 17, wherein the plurality of receptacle modules are removed from the receptacle cage together as a unit by the integrator when the latch is unlatched from the receptacle cage.

\* \* \* \* \*